Oct. 20, 1931.  H. J. CRINER  1,828,128
LUGGAGE CARRIER
Filed May 6, 1929  2 Sheets-Sheet 2
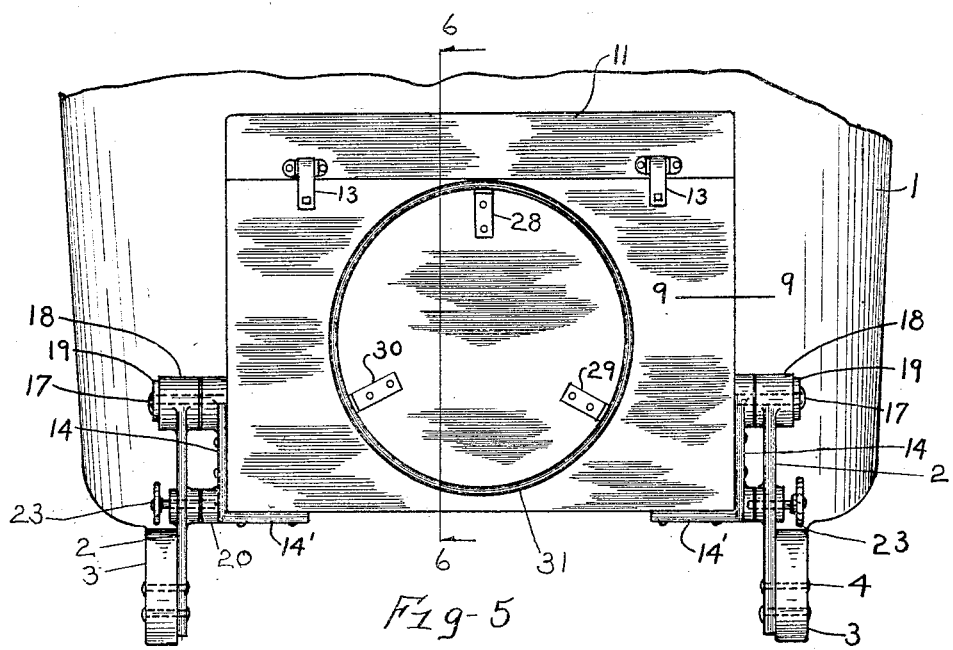
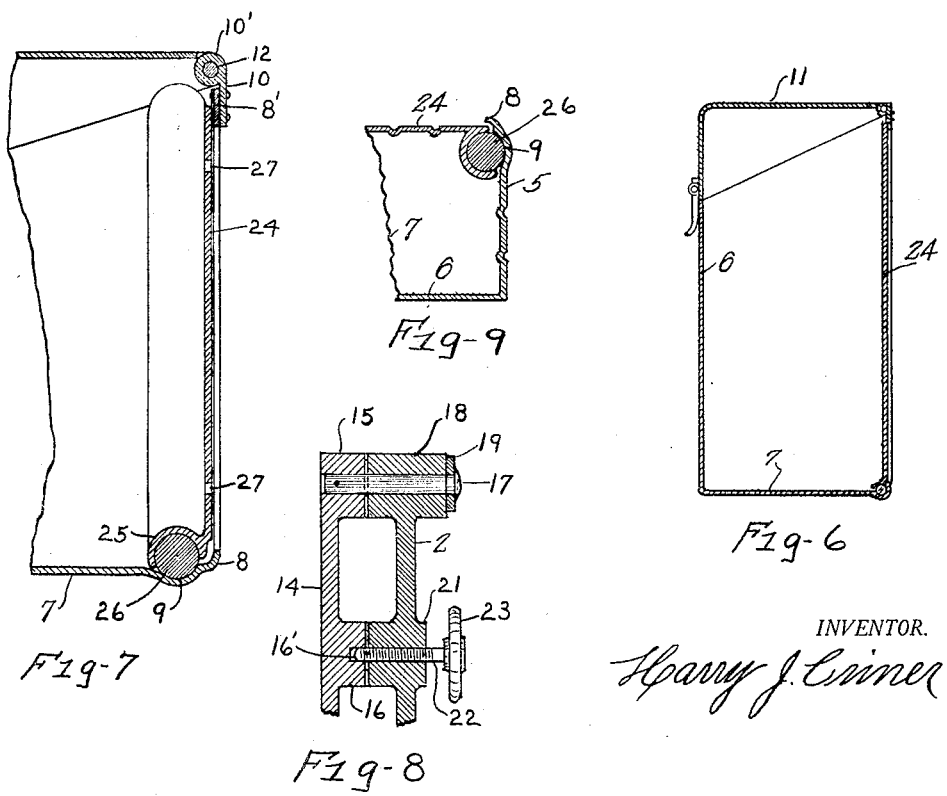
INVENTOR.
Harry J. Criner Patented Oct. 20, 1931

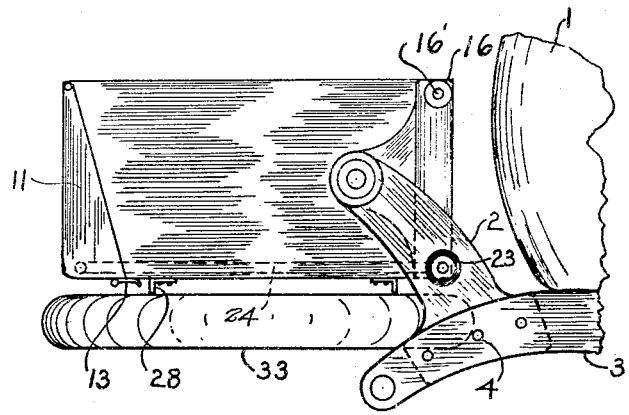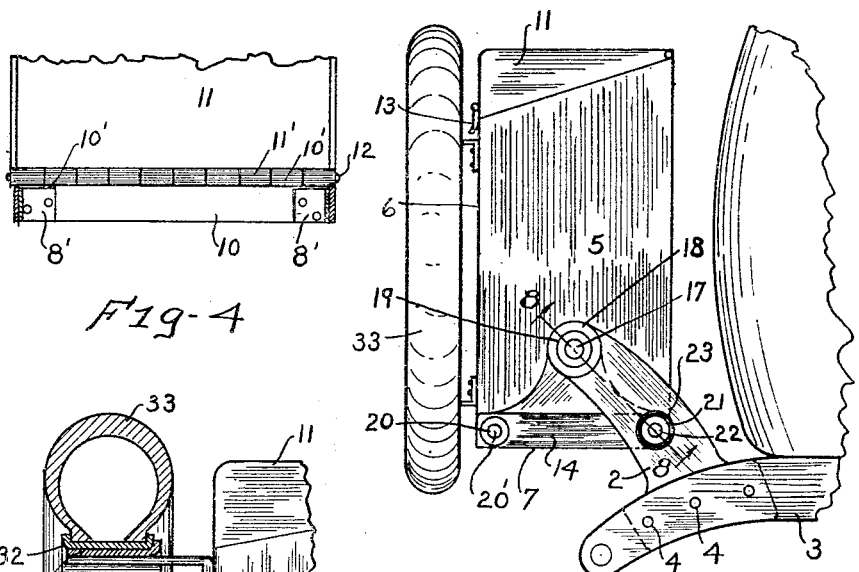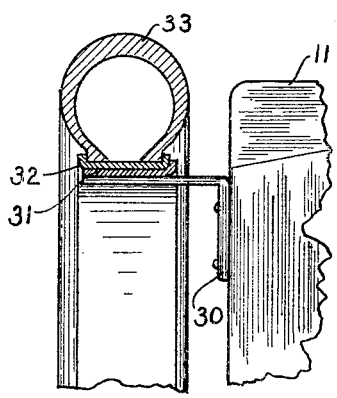

1,828,128

UNITED STATES PATENT OFFICE

HARRY J. CRINER, OF DAVENPORT, IOWA, ASSIGNOR OF ONE-HALF TO A. G. BUSH, OF DAVENPORT, IOWA

LUGGAGE CARRIER

Application filed May 6, 1929. Serial No. 360,760.

My invention relates to combined luggage and freight carriers for automobiles.

The objects of my invention are:

1. To provide a closed luggage carrier for automobiles which can be adjusted to form an open carrier for machines, produce or other freight;

2. To provide a simple combination carrier for luggage and freight which will be strong, may be readily adjusted from one position to another, and may be readily secured against rattling in either position.

I attain these objects by the means illustrated in the accompanying drawings, in which, Figure 1 is a side elevation of my carrier in its vertical or closed position; Fig. 2 is a side elevation showing the carrier in its open or horizontal position; Fig. 3 is an enlarged detail showing the means for securing the spare tire carrier to the luggage carrier; Fig. 4 is a detail showing the hinge with the top or cover in vertical position; Fig. 5 is rear elevation of my appliance; Fig. 6 is a vertical cross-section on the line 6—6 of Fig. 5; Fig. 7 is an enlarged detail of a portion of Figure 6 with intermediate portions broken away, and Figure 8 is an enlarged section on the line 8—8 of Figure 1; Fig. 9 is an enlarged detail in cross-section on the line 9—9 of Figure 5 to show the relative positions of the flange and groove of the side plate, 5, front plate, 24, and flange ring containing the rubber band, 26, and shows the side plate, 5, and front plate, 24, with strengthening beads rolled therein. In Figures 7 and 9 I have exaggerated the size of the rubber band, 26, and the flanges and groove which retain it.

Similar numerals refer to similar parts throughout the several views. My appliance is designed to be mounted at the rear of an automobile body, 1, upon brackets, 2, secured to the side frames, 3, of the automobile by bolts or rivets, 4. For convenience I refer to the right of Figure 1 as the "front" and the left of Figure 1 as the "back" or "rear".

My appliance comprises a trunk body preferably formed with side plates, 5, and a rear plate, 6, and bottom plate, 7, stamped or pressed from a single sheet of metal of suitable thickness, but the side, back and bottom plates, 5, 6 and 7, respectively, may be formed from separate sheets and welded, riveted or otherwise suitably united as may be found most efficient and economical from a manufacturing standpoint.

The front edges of the side and bottom plates are formed with a flange, 8, running all around the front edges thereof and a groove, 9, is formed immediately back of the flange, 8, which also extends the full length of the edges of the side and bottom plates. At the upper ends of the flanges, 8, the flanges are extended inwardly at 8' and a crossbar, 10, having hinge members, 10', formed integral therewith, is riveted to the extensions, 8', of the flanges and extends clear across the front of the trunk or body. A top or cover, 11, having corresponding hinge members, 11', formed integral therewith, is hinged to the crossbar, 10, upon a hinge-pin, 12.

A cover, 11 is preferably formed to overlap the upper edges of the side plates, 5, and the rear plate, 6, of the trunk and may have its sides sloped as shown in Figure 1, and the upper edges of the body of the trunk may be sloped at its upper edges to correspond so as to make it a little easier to insert luggage in the trunk or the top of the trunk may be level and the cover shaped to correspond.

Spring fasteners, 13, may be attached to the cover and the back plate of the trunk to lock same in closed position and may be of any of the well-known types in common use.

By having the edges of the top, 11, overlap the top of the side and rear plates of the trunk, it will avoid wetting of the contents of the trunk from rain when in vertical position.

Re-enforcing plates, 14, are spot-welded or otherwise suitably secured to the sideplates of the trunk on each side thereof, with bosses, 15 and 16, formed integral therewith. The bosses, 15, have secured therein pivot bolts, 17, which extend through hubs, 18, formed upon the upper ends of the brackets, 2, thereby pivoting the trunk upon the brackets, 2. Washers, 19, are preferably inserted between the heads of the pivot bolts, 17, and the hubs, 18.

The bosses, 16, are located at the lower front corners of the trunk when in vertical position as shown in Figure 1 and similar hubs, 20, are formed at the lower rear corners of the trunk upon the re-enforcing plates, 14, and the re-enforcing plates preferably have an extension, 14', formed integral therewith and riveted or spot-welded to the bottom plate of the trunk.

An intermediate hub, 21, is formed upon each bracket, 2, and a hand-screw, with wheel, 23, secured upon the outer end thereof, is threaded into each hub, 21.

An opening, 16', extends into each boss, 16, adapted to receive the inner end of the bolt, 22, so as to lock the bosses, 16, and hubs, 21, together.

Similar openings, 20', are formed in the bosses 20.

When it is desired to shift the trunk from the vertical position shown in Figure 1, to the horizontal position shown in Figure 2, the bolts, 22, are unscrewed sufficiently to clear the bosses, 16. The trunk is then lowered to the horizontal position and the bolts, 22, are screwed into the openings, 20', thereby locking the trunk in the horizontal position. When desired to move the trunk from the horizontal to the vertical position, the operation is reversed.

In order to close the front of the trunk, I provide a front plate, 24, which has a flange ring, 25, formed integral with the sides and bottom thereof. This flange ring is somewhat exaggerated for clearness of illustration in Figure 7 and contains a rubber stopper, 26, preferably of soft rubber, which will give sufficiently to allow the front plate, 24, to be moved from its normal position and lowered to the bottom of the trunk when in horizontal position as shown in dotted lines in Figure 2.

In order to facilitate moving the front plate of the trunk to and from the bottom of the trunk when in horizontal position, I provide finger holes, 27, therein which, by reason of their protected position when the trunk is in the vertical position, will not allow any appreciable leakage, but if desired, suitable handles, similar to drawer pulls, may be attached to the front plate, 24, of the trunk, to aid in moving it. As my appliance may be used with various forms of front plate, I do not limit my invention to any particular form, but I prefer to use the form shown in the drawings on account of its freedom from rattling, the rubber packing, 26, being such as to prevent rattling.

In order to provide for the carriage of a spare tire at the rear of the automobile, I secure a plurality of brackets, 28, 29 and 30. On the brackets 28, 29 and 30, I mount a ring or band, 31, upon which a removable rim, 32, of an automobile wheel may be mounted and secured by any of the means in common use. I have shown an automobile tire, 33, mounted upon the brackets in Figures 1, 2 and 3, but for clearness of illustration, omitted the tire in Figure 5.

In assembling my trunk, I prefer to insert the front plate, 24, into the trunk from the top after the remainder of the trunk has been assembled. The rubber strip, 26, may be secured in the flange ring, 25, by being cemented therein or by any other suitable means, or if desired, the flange, 25, may be continued across the top of the front plate, 24, and the rubber, 26, formed of a continuous band or ring.

In forming my trunk the side plates, 5, and the back plate, 6, are formed of metal sheets or plates of sufficient thickness to carry any weight which is likely to be imposed upon them when in horizontal position without deflection or deformation and may be strengthened if desired, by rolling beads therein or by attaching strengthening or stiffening members thereto.

In my preferred form of trunk, the front plate may be easily removed entirely from the trunk when it is turned to a horizontal position or it can be left in its normal position or moved back into juxtaposition with the rear plate of the trunk. When used in horizontal position, the front plate, 24, will ordinarily not be required and it will be a convenience to have it entirely removed, but when desired to have a closed trunk in horizontal position, the front plate may be left in its normal position as in Figure 1.

The size and proportion of the various parts may be varied to suit the requirements of each particular case.

I claim:

1. A combined freight and luggage carrier of the class described, comprising a trunk having rigidly connected side, back and bottom plates, a movable front plate secured thereto, a cover hingedly connected to the front upper corners of the side plates when in vertical position, re-inforcing plates secured to the side plates of the trunk near the bottom thereof, pivot pins united to the re-enforcing plates above the bottom of the trunk and approximately midway between the front and back edges of the side plates, front and rear bosses formed integral with the supporting plates near the lower corners thereof, supporting brackets united to the frame of the automobile bearing the trunk having hubs united to the upper ends thereof in which said pivot pins are movably mounted, a hand-screw threaded into each of the supporting brackets, and openings formed in the bosses adapted to receive the inner ends of the hand-screws when such bosses are brought into line with the hand-screws as the trunk is moved to its vertical or horizontal position respectively.

2. An automobile luggage carrier comprising a trunk having integral side, bottom and rear plates with a cover hingedly connected thereto, internal grooves formed adjacent the front edges of the side and bottom plates, a front plate having a grooved flange formed integral therewith adjacent its side and bottom edges, a packing ring or band secured in said grooved flange and adapted to seat in the grooves of the side and bottom plates of the trunk.

3. An automobile luggage carrier comprising a trunk having integral side, bottom, and rear plates, with a cover hingedly connected thereto, internal grooves formed in the side and bottom plates adjacent the front edges thereof, a detachable front plate adapted to seat in said grooves, and removable means to form a water-tight joint between the edges of the front plate and the internal grooves.

In testimony whereof he affixes his signature.

HARRY J. CRINER.